ively parallel beams interconnected by cross-beams. At least two bridges are supported by the basic frame and are movable towards and away from the basic frame by a lifting mechanism. The bridges and basic frame have complementary shapes to facilitate proper positioning of the bridges with respect to the basic frame.

United States Patent [19]
Damm

[11] 4,227,843
[45] Oct. 14, 1980

[54] DEVICE FOR COUPLING, TRANSPORTATION AND PLACING OF GOODS CONTAINERS

[76] Inventor: Sverre Damm, Anton Schudis vei 25, Oslo 5, Norway

[21] Appl. No.: 880,565

[22] Filed: Feb. 23, 1978

[30] Foreign Application Priority Data
Feb. 23, 1977 [NO] Norway ................................ 770597

[51] Int. Cl.³ ............................................... B60P 1/64
[52] U.S. Cl. ................................. 410/54; 296/35.3; 410/82; 410/87; 410/88; 414/498
[58] Field of Search ............. 214/515, 512; 296/35 A, 296/35.3; 105/366 E, 366 A, 366 B, 366 C, 366 D, 463, 464, 465; 414/498, 495; 410/54, 68–88, 89–91

[56] References Cited
U.S. PATENT DOCUMENTS

| | | | |
|---|---|---|---|
| 3,119,503 | 1/1964 | Herpich et al. | 214/515 X |
| 3,367,615 | 2/1968 | Turpen | 105/366 A |
| 3,626,868 | 12/1971 | Mowatt-Larssen et al. | 105/366 A |
| 3,719,299 | 3/1973 | Oehler | 214/515 |
| 3,786,951 | 1/1974 | Ruff et al. | 214/512 |

Primary Examiner—Stephen G. Kunin
Assistant Examiner—Edmond G. Rishell, Jr.
Attorney, Agent, or Firm—Fleit & Jacobson

[57] ABSTRACT

A device for supporting a container on a chassis of a vehicle and for coupling the supported container to the chassis. The device has a basic frame defined by a pair of longitudinal, substantially parallel beams interconnected by cross-beams. At least two bridges are supported by the basic frame and are movable towards and away from the basic frame by a lifting mechanism. The bridges and basic frame have complementary shapes to facilitate proper positioning of the bridges with respect to the basic frame.

8 Claims, 7 Drawing Figures

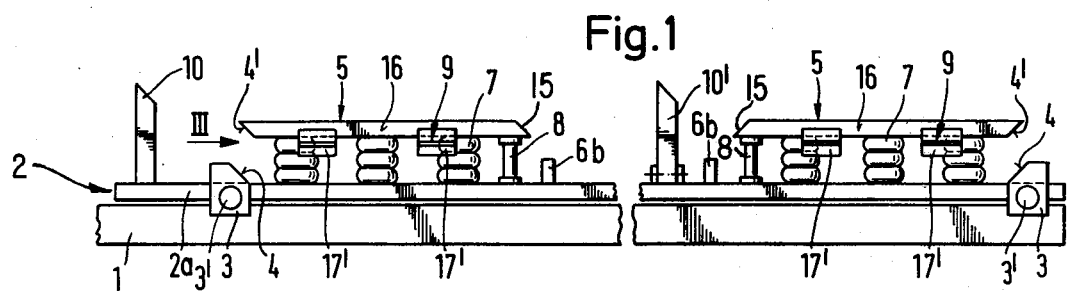
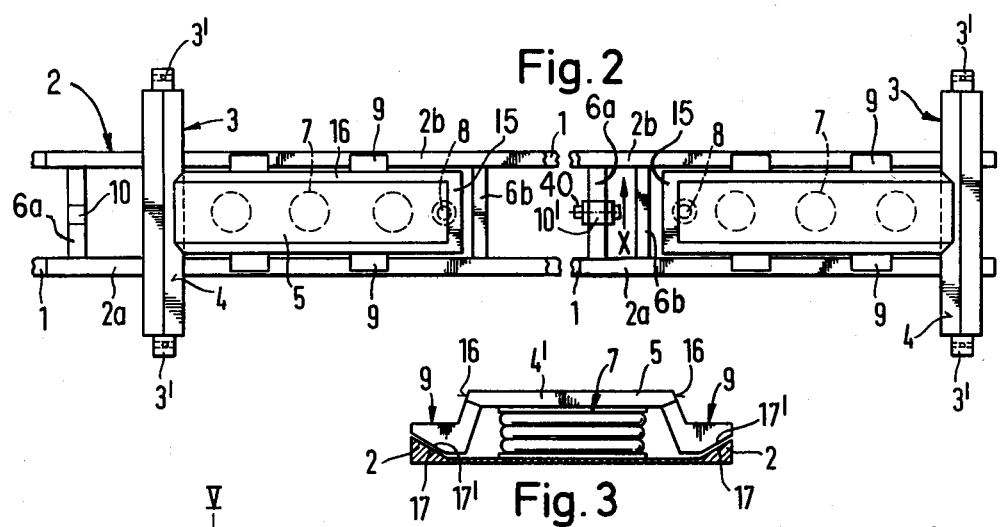
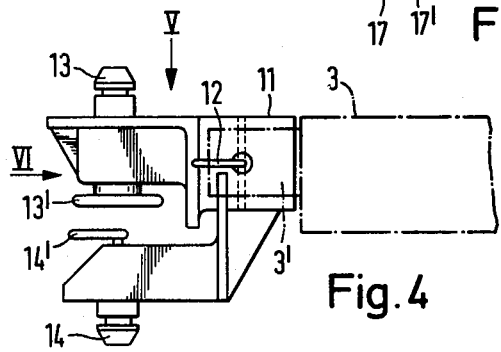
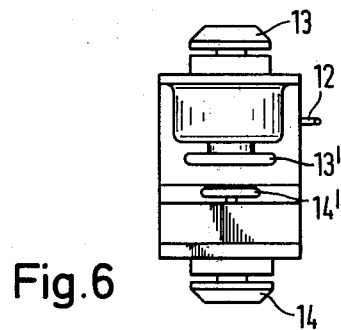
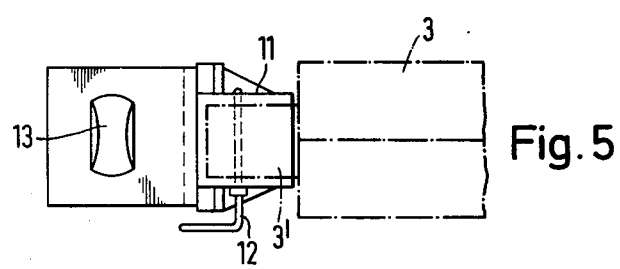

DEVICE FOR COUPLING, TRANSPORTATION AND PLACING OF GOODS CONTAINERS

BACKGROUND OF THE INVENTION

1. Field of the Invention

The present invention relates to a vehicle for transporting a goods container.

2. Description of the Prior Art

During recent years, a tremendous development has taken place in connection with the so-called Pendel-Plan and container transportation. However, the previously used systems are not uniform and cause, therefore, great problems, if not to say chaotic conditions, all over the world in container traffic. All producers of equipment for transportation of containers use their own system which they regard as being the best one. Therefore, in many cases, it is necessary to re-load the goods in other containers or provide for vehicles or trailers for transportation of containers which are made according to the same system as the container in question. When knowing that nearly 80% of all goods are transported on roads, the additional costs in connection with re-loading or demand for certain equipment will influence the economy in all countries and accordingly also the economy of each individual will be involved.

SUMMARY OF THE INVENTION

The object of the present invention is to eliminate these drawbacks and create a device which may be used in connection with the different types of containers on the market. This device is for coupling, transportation and placing of goods containers, and the general purpose is that with one and the same vehicle (truck or trailer) one may couple goods containers built according to different standards, such as the Pendel-Plan system, EURO- and ISO-norms and other systems in use.

At present different devices are used for backing in under and lifting of goods containers resting on their legs. The lifting mechanism proper may consist of hydraulic cylinders or air cushions. The drawbacks of the devices as hitherto known are, however, that the supporting surfaces of the lifting cylinders are so small that they may only be used in connection with reinforced surfaces on the bottom of the container in order to avoid pressing holes in the container bottom. Due to this the distance between the lifting cylinders must fit to the goods containers which, in each case, has to be placed on the frame of the vehicle so that only certain types of containers may be transported on certain types of trucks or trailers. For delivery of containers from the vehicle, there are today a lot of problems since, as mentioned above, there has not been created any standardized system for placing of the containers at a certain height if they are arranged flush with loading/unloading platforms. If the surface on which a container is to be placed is slanting or very uneven, it is very difficult to bring the container safely to rest on its legs.

A further drawback in connection with the system as hitherto known is that the coupling heads which are arranged at the ends of the supporting beams of the vehicle frame and which are to be connected with corresponding coupling means at the underside of the container, can only be used for coupling of certain types of containers to the frame.

Consequently, the aim of the invention is to obtain one and the same vehicle that can be used for goods containers of different construction and different length. Further, the invention provides container locking means on the vehicle that may be changed by a manipulation for adapting the container locking means to the type of locks with which the container in question is provided.

Particularly, the invention relates to a device for coupling, transportation and placing of goods containers which are built according to different norms, whereby on the frame of the truck or trailer there is arranged a profiled frame provided with at least two lift bridges which may be raised and lowered by means of pneumatic and/or hydraulic and/or electric lifting means, and the characteristic feature of the invention is that each of the lift bridges has a support surface of such continuous length that it covers at least two underneath lifting means, and on the upper side is provided with upwardly and inwardly inclined guiding surfaces and at the underside with inclined guiding surfaces which in the lowered position of the lift bridge are in contact with corresponding inclined surfaces on the frame, and that the ends of two or more container supporting beams fixed to the frame and arranged transversely to same, are provided with container coupling heads of special design.

Thereby the following advantages are obtained:

1. The lift bridges may lift most types of containers from the smallest to the largest, a lifting height of about 30 cm.

2. The lift bridges can be guided in under the container when the vehicle is backed in under same.

3. The lift bridges will automatically attain a correct mutual inclined position when the container to be lifted is on one end of an inclined surface.

4. The relative large surfaces of the lift bridges will always provide an evenly distributed pressure against the bottom of the container, independent of which standard the lift bridge is built for.

5. Containers with up to four different lock types may be coupled with the locks of the vehicle by a simple turning of the coupling heads.

6. Since the lift bridge on its upper side is provided with upwardly and inwardly inclined surfaces, the surfaces will be guided in between longitudinal channel irons or bars arranged on the bottom of the container so as to guide the container to a correct position on the vehicle when the vehicle is backed in under the container.

BRIEF DESCRIPTION OF THE DRAWING

The above mentioned and further features of the invention will appear from the following description of an embodiment shown in the drawing.

FIGS. 1 and 2 show the lift bridges arranged on the frame of a truck or trailer as seen from the side and from above, respectively.

FIG. 3 shows the lift bridge seen in the direction of the arrow III in FIG. 1;

FIGS. 4–6 show a coupling head as seen from the side, from above and against the end, respectively.

DESCRIPTION OF THE PREFERRED EMBODIMENT

Figure 7:
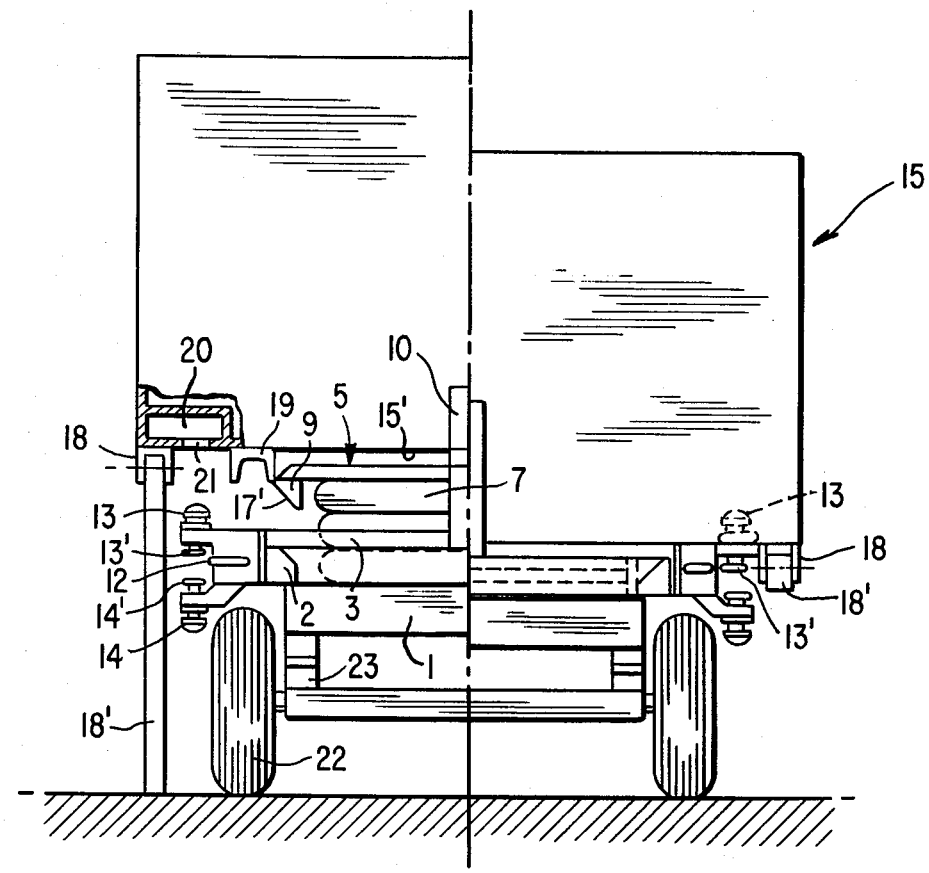
FIG. 7 shows to the left a container before same is lowered on the frame, and to the right a container after having been lowered and coupled with the frame.

On a chassis frame 1 of a vehicle there is placed a frame 2 consisting of two parallel longitudinal bars 2a and transverse bars 6a and 6b. Furthermore, the longitudinal bars 2a are interconnected by transverse beams 3. A container, now shown, rests on beams 3 and 6b during transportation. The foremost and rearmost beam 3 and made with an inclined portion 4 which faces a correspondingly inclined edge 4' on a plate-shaped lift bridge 5 for guiding same. In the embodiment shown, each of said lift bridges is arranged on two or more pneumatic bellows 7. During lifting and lowering of the lift bridges, the bridges are guided by a cylindrical guide 8. The lifting and lowering of the lift bridges may also take place by means of other hydraulic, pneumatic or electric lifting means.

FIG. 3 shows the lift bridge in the direction of the arrow III in FIG. 1 in its lowered position. As shown, each lift bridge has feet 9 protruding from the longitudinal sides of same, the underside of which feet is inclined outwardly and upwardly, as indicated by 17', in order to cooperative with the longitudinal profile beams of the frame 2 which are correspondingly shaped, as indicated by 17. An anterior stop 10, FIGS. 1 and 2, is fixed to the frame in order to guide the container in correct position on the frame. If the container is of greatest length, same will be supported by both lift bridges 5 during lowering onto the frame 2. If two smaller containers are to be arranged on one and the same frame, each of them is lifted by one of the lift bridges 5, and for this purpose there is arranged a further stop 10' which can be turned down, as indicated by the arrow X in FIG. 2. In other words, stop 10' is movable between a raised blocking position and a lowered non-blocking position. For instance, as illustrated in FIG. 2, the lower end of stop 10' is pivotally connected to transverse bar 6a by a shaft 40.

When a container resting on the ground on its legs is to be placed on the frame 2, a truck or trailer provided with such frame and with lift bridges 5 is backed in under the container, whereupon the lift bridges are raised until they are located between two beams or channel irons fixed to the bottom of the container and on which the container is to rest when standing on a platform or the like. During continued lifting movement, the container is raised to a position in which its legs, which may be extendible, are clear of the ground so that they may, in case, be shortened and possibly turned in under the container bottom. Then the lift bridges 5 are lowered until the container rests on the support beams 3 and 6b. During backing of the truck or trailer with the lift bridges in lowered position beneath the container, the inclined surfaces 16 of the bridges 5 will serve to guide said bridges in between the beams or channel irons on the container bottom for correct positioning of the container upon the frame 2. During the subsequent lowering of the lift bridges, the bridges will be guided to correct positions by means of the corresponding inclined surfaces 4, 4' (FIG. 1) and 17, 17' (FIG. 3), respectively.

The ends 3' of the container supporting beams 3 are provided with cylindrical taps on each of which there is arranged a turnable coupling head as shown in FIGS. 4, 5 and 6 and in the example shown provided with two different coupling means 13 and 14 for two different types of container locking systems. Said coupling head comprises a hub 11 which is arranged on the cylindrical tap 3' of the beam 3 and which can be turned on said tap and maintained in different positions by means of a bolt 12 which is introduced through bores in the hub 11 and holes in the tap 3' according to the possible positions of the coupling head on the tap. When the head is turned 180°, one or the other of the two coupling means 13 and 14 will engage the coupling means of the container when same is lowered to rest on the beams 3 and 6b. Said coupling heads may be provided with up to four different container locks and are oblong, see FIG. 5, so as to enter correspondingly shaped openings in the bottom of the container when same is lowered to rest on the frame 2. In order to lock the container to the frame the coupling means 13 and 14 are then turned 90° by means of a wheel 13' and 14' or the like so that the container will be held fast on the frame during transportation.

FIG. 7 shows to the left a container 15 of a known type resting on feet 18', which are hinged between a pair of flaps 18. In this position, a vehicle equipped with a frame 2 resting on a chassis 1 may be backed in under the container 15 until stop 10 contacts the front end of the container. This is also true if two containers of shorter length are to be placed on the frame 2. The first container will contact stop 10 and the second will contact stop 10', which has been moved to a raised position after passage of the first container. Longitudinal channel irons 19 are conventionally welded to the bottoms of containers presently in use. The distance between the channel irons 19 is equal to or greater than the width of the lift bridges 5 so that when the bridges are raised they will be located just between the channel irons 19. After having been located between the irons, the lift bridges 15 are further raised to contact the lower surface 15' of the container. In this position, the legs 18' will be freed from the ground to be swung in under the bottom wall of the container. Then, the lift bridges 15 are lowered so that the container is brought to rest on the supporting beams 3 and 6b, as shown to the right. During the lowering movement of the container, the coupling heads 13 will enter holes 21 in the bottom wall of the container near the corners of same, whereupon the heads 13 are turned 90° by means of the wheels 13', said heads 13 being oblong. The holes 21 are covered by boxes 20 welded to the inner wall and inner bottom of the container. During the lowering movement the springs 23 of the vehicle will be somewhat compressed as shown to the right in FIG. 7.

By means of the combination as described above and which consists of two long lift bridges and up to four turnable container locks of different design, one can by means of one and the same vehicle arrange, couple and transport goods containers which are constructed according to the Pendel-Plan system and other different norms.

I claim:

1. A device for supporting a container on a chassis (1) of a vehicle and for coupling the container to the chassis, said device comprising: a pair of longitudinal, substantially parallel beams (2) defining a basic frame linkable to said chassis (1), each longitudinal beam (2) of said pair having a sloped inside face (17), the inside faces (17) of the two beams (2) facing each other; cross-beams (3) mounted near end portions of said pair of beams (2), said cross-beams having facing sloped faces (4); at least two bridges (5), each bridge having a platform (5) which covers part of the space defined between said pair of longitudinal beams (2), each platform having at one of its ends a sloped lower face (4') complementary to the sloped face (4) of the cross-beam (3) to which it is adjacent, and each platform (5) having downwardly projecting side feet (9) with lower surfaces complementary sloped to said sloped faces (17) of the two longitudinal beams (2); lifting means (7) arranged below said platforms (5) for raising said bridges into contact with the bottoms of containers to be supported; and means for coupling a supported container with said device.

2. A device as claimed in claim 1, in which said lower sloped surfaces of said feet (9) are shaped to fit between a pair of longitudinal parallel supporting bars forming part of the bottom of a container.

3. A device as claimed in claim 1 or 2, in which said longitudinal beams (2) support beyond said crossbeams (3) a first stop (10) which projects upwardly from said basic frame.

4. A device as claimed in claim 3, in which between the pair of bridges (5) there is arranged a second stop (10'), said second stop (10') being movable between a raised and a lowered position.

5. A device as claimed in claim 1, in which between said two bridges (5) and between the pair of longitudinal beams (2), additional cross-beams (6b) are arranged, which project above the longitudinal beams to a height equal to the height of said cross-beams (3) having sloped faces (4).

6. A device as claimed in claim 5, in which end portions of said cross-beams (3) having sloped faces (4) project beyond the longitudinal beams (2), each projecting end portion supporting means for connecting a container to the device.

7. A device as claimed in claim 6, in which said anchoring heads are provided with a hub (11) rotatably mounted on said bolt (3'), each of said hubs including blocking means (12) and a plurality of anchoring heads (13,14) which are angularly spaced.

8. A device as claimed in claim 7, in which said anchoring heads are rotatably mounted on said hubs.

* * * * *